(12) United States Patent
Choinière et al.

(10) Patent No.: US 11,996,928 B2
(45) Date of Patent: May 28, 2024

(54) RESOURCE DEPLOYMENT OPTIMIZER FOR NON-GEOSTATIONARY AND/OR GEOSTATIONARY COMMUNICATIONS SATELLITES

(71) Applicant: TELESAT TECHNOLOGY CORPORATION, Ottawa (CA)

(72) Inventors: Eric Choinière, Ottawa (CA); Rahul Minhas, Ottawa (CA)

(73) Assignee: TELESAT TECHNOLOGY CORPORATION, Ottawa (CA)

( * ) Notice: Subject to any disclaimer, the term of this patent is extended or adjusted under 35 U.S.C. 154(b) by 0 days.

(21) Appl. No.: 18/208,715

(22) Filed: Jun. 12, 2023

(65) Prior Publication Data
US 2023/0344511 A1    Oct. 26, 2023

Related U.S. Application Data

(63) Continuation of application No. 17/274,766, filed as application No. PCT/CA2019/051267 on Sep. 10, 2019, now abandoned.

(30) Foreign Application Priority Data

Sep. 10, 2019   (CA) .............................. CA 3017007

(51) Int. Cl.
*H04B 7/185*    (2006.01)
*H04W 24/02*    (2009.01)
(Continued)

(52) U.S. Cl.
CPC ........ *H04B 7/18539* (2013.01); *H04W 24/02* (2013.01); *H04W 28/16* (2013.01); *H04B 7/19* (2013.01); *H04B 7/195* (2013.01)

(58) Field of Classification Search
CPC .. H04B 7/18539; H04B 7/18513; H04B 7/19; H04B 7/195; H04W 24/02; H04W 28/16; H04W 28/18
See application file for complete search history.

(56) References Cited

U.S. PATENT DOCUMENTS 6,370,126 B1 *   4/2002   De Baere ........... H04B 7/18539
                                                    455/12.1
8,914,536 B2    12/2014   Beeler et al.
(Continued)

OTHER PUBLICATIONS

Alberti X et al.: "System capacity optimization in time and frequency for multibeam multi-media satellite systems", Advanced Satellite Multimedia Systems Conference (ASMA) and the 11$^{th}$ Signal Processing for Space Communications Workshop (SPSC), 2010 5$^{th}$, IEEE PISCATAWAY, NJ, USA, Sep. 13, 2010 (Sep. 13, 2010), pp. 226-233, XP031764168, ISBN: 978-1-4244-6831-7 * Section III *.

(Continued)

*Primary Examiner* — Keith Ferguson
(74) *Attorney, Agent, or Firm* — GREENBLUM & BERNSTEIN, P.L.C.

(57) ABSTRACT

Systems, methods and techniques are presented for discovering optimal solutions to satisfy communication traffic demands to a NGSO and GSO satellite constellations used for telecommunication. When multiple ground demands (mobile and stationary) are present, a satellite constellation requires an assignment of satellite resources to optimally match the ground demands. The systems, methods and techniques presented can utilize an optimization structure to maximize the objective function, using linear programming in combination with simulation and predictive features. The techniques presented determine optimal or quasi-optimal allocation of scarce and highly constrained satellite resources in an efficient manner. These techniques take into (Continued)

account maximizing capacity while protecting other geostationary and non-geostationary networks.

33 Claims, 8 Drawing Sheets

(51) Int. Cl.
*H04W 28/16* (2009.01)
*H04B 7/19* (2006.01)
*H04B 7/195* (2006.01)

(56) References Cited

U.S. PATENT DOCUMENTS

| | | |
|---|---|---|
| 9,814,004 B2 | 11/2017 | Touret et al. |
| 9,930,621 B2 | 3/2018 | De Gaudenzi |
| 2004/0110467 A1 | 6/2004 | Wang |
| 2012/0188880 A1 | 7/2012 | Beeler et al. |
| 2017/0181160 A1 | 6/2017 | Corbel et al. |
| 2017/0181173 A1 | 6/2017 | Faraj et al. |

OTHER PUBLICATIONS

Office action dated Mar. 18, 2022 in the Eurasian National Phase of the PCT Int'l Application PCT/CA2019/051267 (common with instant application) received from the Eurasian Patent Office, along With English language translation.

Office action dated Nov. 18, 2022 from the Canadian Patent Office, in Canadian counterpart Application No., 3,017,007, with Examination Search Report.

Supplemental European Search Report dated May 2, 2022 in the European National Phase of the PCT Int'l Application PCT/CA2019/051267 (common with instant application), in the English language.

International Search Report issued in International Patent Application No. PCT/CA2019/051267, dated Dec. 12, 2019.

Written Opinion of the International Searching Authority issued in International Patent Application No. PCT/CA2019/051267, dated Dec. 12, 2019.

\* cited by examiner

RESOURCE DEPLOYMENT OPTIMIZER FOR NON-GEOSTATIONARY AND/OR GEOSTATIONARY COMMUNICATIONS SATELLITES

CROSS-REFERENCE TO RELATED APPLICATIONS

This is a Continuation of U.S. patent application Ser. No. 17/274,766, filed on Mar. 9, 2021, which is a US National Stage Application based on International Patent Application No. PCT/CA2019/051267, filed on Sep. 10, 2019. The instant application also claims the benefit of Canadian Application No. 3,017,007, filed on Sep. 10, 2018.

FIELD OF INVENTION

The present invention relates to satellite systems and more particularly, to the provision of a novel, system and method for characterizing and allocating resources in a satellite communications system serving a plurality of users, stationary or mobile, or any combination of stationary and mobile users.

BACKGROUND OF THE INVENTION

Communication networks exist which include one or more satellite in Earth orbit, including satellites in non-geostationary orbit (NGSO). NGSO satellites may be in low Earth orbit (LEO) or medium Earth orbit (MEO). In some cases, a network may include satellites in two or more different types of Earth orbits, including networks with satellites in both GSO and NGSO orbits. Satellites may have a number of antennas (or antenna arrays) arranged to direct one or multiple beams over a coverage area. Satellites typically employ a number of radio wave frequencies or frequency bands so they can communicate through multiple channels at the same time. Radio wave frequencies may also be re-used multiple times on a satellite provided that the frequencies are employed in a manner that avoids an unacceptable level of interference. Placing transmit and receive beams far enough apart to minimize interference is one method that may be used to enable frequency reuse on a satellite.

In the past, it was common for satellite communication networks to serve a number of stationary customers, often using GSO (geostationary orbit) satellites. For networks using GSO satellites in particular, the satellites remain in a near fixed position in the sky as viewed from the surface of the Earth, and it is easy to plan where the satellite beams should be pointed, and what frequencies and frequency bands should be assigned to each beam. Planning and management of satellite resources is straightforward and predictable in these types of networks.

There is now an increasing demand for satellite communication services, often in remote locations, sometimes in localized groups or clusters and sometimes highly and randomly distributed across an area, including mobile services to passengers on aircraft, sea vessels, and other platforms that may be fixed or in motion. These services may have varying, fluctuating or intermittent requirements. Management of satellite resources in these kinds of environments is more difficult that in current systems. Emerging NGSO satellite networks are now being built to serve thousands or millions of customers, many of whom are in motion, with a wide range of terminal types, data rates, and performance requirements. Because the NGSO satellites are not stationary with respect to any point on the surface of the Earth, it may be necessary to switch a customer's service from one satellite to another (i.e. perform a 'handoff') in the course of providing a communication service. In addition, NGSO satellites may be arranged to communicate between themselves using Inter-Satellite Links (ISLs) as a single satellite may not cover the geographic regions of both the Earth-based data source and Earth-based data destination of a communication link. A system and method are required to allocate and coordinate satellite and ground-based resources to satisfy customer demand in these dynamic satellite networks. Such a system utilizes resource optimization techniques to allocate communication resources by assigning one or multiple satellite antenna beams, possibly one or multiple ISL connections, and various ground network elements, based on the overall topology of the system, to best serve customer demand.

Existing resource optimization techniques do not address the challenges of such NGSO satellite networks. There is a need for an improved system and method for allocating the communications resources of these types of satellite networks.

SUMMARY OF THE INVENTION

It is an objective of the invention to provide an improved system and method for allocating resources in a satellite system serving a large number of customers, both stationary and mobile.

Systems, methods and techniques are presented for discovering quasi-optimal (within the finite set of parameters used to represent the problem) solutions to satisfy communication traffic demands to a NGSO satellite constellation used for telecommunication. When multiple demands for service (mobile or stationary or a combination of both) are present, a NGSO constellation must assign satellite resources to meet customer demands. The systems, methods and techniques presented can utilize an optimization formulation to maximize the objective function, using linear programming in conjunction with simulation and predictive features. The techniques included, determine optimal allocation of scarce and constrained satellite resources in an efficient manner. These techniques take into account maximizing system capacity, revenue or other metrics while meeting satellite payload limits such as radiated power limit, bandwidth constraints, frequency reuse constraints, meeting gateway capacity and bandwidth limits, and protecting other GSO and NGSO networks from unacceptable interference.

The Resource Deployment Optimizer is an engineering system and method that provides an optimal or near-optimal solution to the problem of satellite resource allocation. The satellite resource allocation problem lies at the core of a NGSO constellation's system resource management. The Resource Deployment Optimizer generates optimal or near optimal solutions to this problem. These solutions may be communicated throughout the entire satellite constellation and the ground network by a system resource management function. The system resource management function may act as a master controller that assigns communication resources in real time, including but not limited to beam configurations, satellite beam pointing and beam hopping schedule, satellite transmit power, channel bandwidths, symbol rates, data rates, gateway route selection and data path priorities.

The invention also comprises a Constellation Linearizer, that is, a method to linearly characterize potential links while accounting for power flux density (pfd) masks for protection of other networks from unacceptable levels of interference, thus ensuring that applicable regulatory requirements are met. The Constellation Linearizer can take into account all potential satellite-to-user links, both uplink and downlink, including their spectral efficiency and payload power utilization. The Constellation Linearizer may perform the required calculations as independent tasks and may be well suited for parallel processing. The Constellation Linearizer may comprise the following:

Each serial process characterizes the constellation at a single time step.

A large number of independent serial processes are spawned in parallel over a large pool of processors and characterize the constellation at all time steps.

Owing to the independence of the tasks, their coarse granularity and the effective nature of the parallelization, the computational requirements scale linearly with the number of processors and remains manageable even for large networks.

The invention further comprises an Allocation Optimizer to optimally or near optimally assign satellite resources (bandwidth, power, etc.) and gateway resources (bandwidth, capacity, etc.) to available links to satisfy the user capacity uplink and downlink demand within the constraints of the constellation architecture and other factors. This process may comprise:

Definition of the problem which limits the number of integer unknowns to a strict minimum;

3-step approach to solving the problem with a still large number of integer unknowns; and Venetian Blind method to solve for a continuous stream of time steps while ensuring continuity of connection.

As noted in the background, it is not unusual to have thousands or millions of user terminals in the network. Multiplying the number of user terminals by the number of satellites, beams, inter-satellite communication channels and operating parameters results in a large number of permutations and combinations. The conventional approach to solving such a problem would be to simplify the problem by considering resource allocation on a cell-by-cell basis, including both satellite and beam assignments. Contrary to the conventional approach, it has been found that a cell-by-cell analysis does not work as effectively as the Allocation Optimizer approach described herein. Our preferred approach of beam assignment by individual grid point, whether satellite assignment is performed by cell or by grid point, has been found to be more effective than narrowing the input conditions as in the conventional approach, which may result in a poor solution if the problem can be solved at all. The process of the current invention reduces the complexity of the analysis, resulting in a good solution, which can be solved more easily. In short, the Allocation Optimizer process may comprise three alternate objectives: 1) prioritization of minimum satisfaction, 2) balancing average and minimum satisfaction, or 3) balancing average satisfaction and aggregate capacity ratio or aggregate revenue ratio. In the case of the $1^{st}$ objective type, a 3-step approach is required to make the problem easier to solve:

determining a relaxed solution (i.e. an approximate solution) to a mixed-integer linear programming problem by converting integer (binary) variables to continuous variables;

maximizing the minimum satisfaction, that is, the ratio of the given bandwidth to the requested bandwidth; and then solving the original mixed integer programming (MIP) problem with a better-behaved objective, specifically, a known minimum bound.

In addition, the invention may comprise a Demand Relaxation Algorithm to condition the demand to a feasible state. Users may demand satellite resources which go beyond the available capacity. In order to provide an effective solution, the Demand Relaxation Algorithm may relax the demand in order to determine a feasible demand grid that can be met. This feasible demand grid is then used as an input in the real-time operational Constellation resource management system.

The invention may also comprise full link routing and selection optimization. That is, both forward and return links to user terminals are routed to a Point of Presence (PoP) through a gateway which is the physical site where the service provider or customer connects to the network. This routing is determined by the Allocation Optimizer, and adds the following constraints:

aggregate throughput supported by all active links from a given PoP to a given user satellite must match the total throughput delivered to all users assigned to that PoP from this satellite (applies in both forward and return directions);

aggregate throughput of all active links over a given ISL must be equal to or less than the ISL throughput capability;

aggregate bandwidth required to support all active links through a landing station/satellite beam must not exceed the total bandwidth assigned through that beam (applies in both the forward and return directions);

optionally, the latencies of the active links can be mixed into the LP optimization objective, with the goal of minimizing latency without unduly affecting throughput; and optionally, jitter can be minimized by running the multi-step version of the Allocation Optimizer and penalizing changes in latency from a PoP to a given user through a modification of the LP optimization objective.

The invention may comprise a Fading Analysis and Mitigation function as part of the optimization process. Rain fade or rain attenuation is a consideration in satellite communication, where presence of rain causes weakening of signals. In the prior art, rain fade margins are often based on long-term availability using the International Telecommunication Union (ITU) recommendations, accounting for rain fade on every link. In contrast, the process of this invention, rain fade is not systematically booked on every link. In this invention, constellation performance is determined using a set of historical globally distributed rain rate data, rather than booked on each link, and resource allocation is then optimized using the rain rate model in the global distribution forecast.

One aspect of the invention can be characterized as a communication system comprising: a constellation of a plurality of non-geostationary and/or geostationary satellites, each of the satellites having assignable communication resources; a ground system consisting of one or more Earth stations for transmitting to, and receiving signals from, the constellation of satellites; a plurality of satellite terminals for transmitting to, and receiving signals from, the constellation of satellites; and a controller operable to dynamically assign satellite and ground system resources in response to demand for communications services required by the plurality of satellite terminals. The controller is further operable to: pre-compile a link budget recipe and compute link budgets for all potential links; and execute an optimization algorithm which uses the pre-computed link budgets to dynamically assign satellite and ground system resources in response to demand for communications services required by the plurality of satellite terminals.

Another aspect of the invention may be characterized as a method of operation for a satellite system comprising: providing a constellation of a plurality of non-geostationary and/or geostationary satellites, each of the satellites having assignable communication resources; a ground system consisting of one or more Earth stations for transmitting to, and receiving signals from, the constellation of satellites: and a plurality of satellite terminals for transmitting to, and receiving signals from, the constellation of satellites; and dynamically assigning satellite and ground system resources in response to demand for communications services required by the plurality of satellite terminals. And on this system: pre-compiling a link budget recipe and computing link budgets for all potential links; and executing an optimization algorithm which uses the pre-computed link budgets to dynamically assign satellite and ground system resources in response to demand for communications services required by the plurality of satellite terminals.

Other aspects and features of the present invention will be apparent to those of ordinary skill in the art from a review of the following detailed description when considered in conjunction with the drawings.

BRIEF DESCRIPTION OF THE DRAWINGS

These and other features of the invention will be more apparent from the following description in which reference is made to the appended drawings wherein.

Similar reference numerals have been used in different figures to denote similar components.

DETAILED DESCRIPTION

One or more currently preferred embodiments have been described by way of example. It will be apparent to persons skilled in the art that a number of variations and modifications can be made without departing from the scope of the invention as defined in the claims.

As explained above, there is a need for an improved system and method for allocating resources in a satellite system with flexible resources serving a large number of customers, both stationary and mobile. The Resource Deployment Optimizer of the invention provides a solution to this problem, determining the allocation of satellite resources in real time, and communicating this allocation throughout the entire satellite constellation and the ground network.

Figure 1:
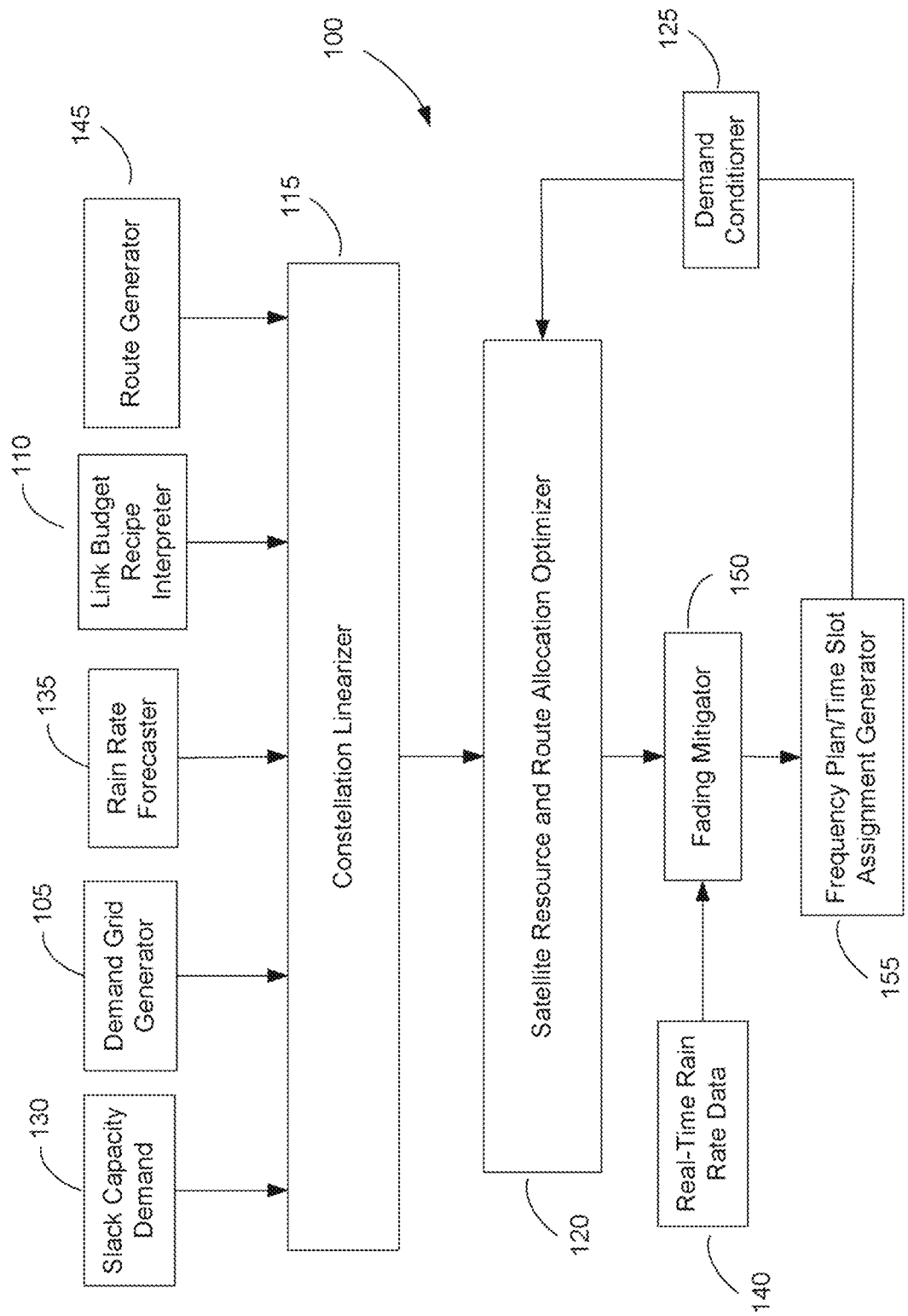
FIG. 1 presents an exemplary block diagram of the processing modules in an embodiment of the Resource Deployment Optimizer.

In the preferred embodiment the Resource Deployment Optimizer 100 includes the following components as shown in FIG. 1:

Demand Grid Generator 105
Link Budget Recipe Interpreter 110
Constellation Linearizer 115
Satellite Resource and Route Allocation Optimizer 120
Demand Conditioner 125
Slack Capacity Demand 130
Rain Rate Forecaster 135
Real-Time Rain Rate Data 140
Route Generator 145
Fading Mitigator 150
Frequency Plan/Time Slot Assignment Generator 155

The Resource Deployment Optimizer 100 may be implemented in any programming language typically used for engineering design. The Allocation Optimizer 120 may be constructed using multiple instances of linear programming formulations, any available mixed integer linear programming solver may be utilized such as, for example, Gurobi, CPLEX, etc. For the purposes of the system described below, the Resource Deployment Optimizer 100 was implemented using Gurobi.

The Resource Deployment Optimizer 100 uses discrete time steps. Time steps are sufficiently small (typically 1 minute) to allow for sufficient utilization of links down to the minimum ground elevation. Intermediate time samples with a smaller time interval may be used to lower computational cost by assuming stable links between the original time samples. The intermediate-step computations do not require integer or binary variables, contrary to the original samples, thereby achieving faster resolution.

Figure 2:
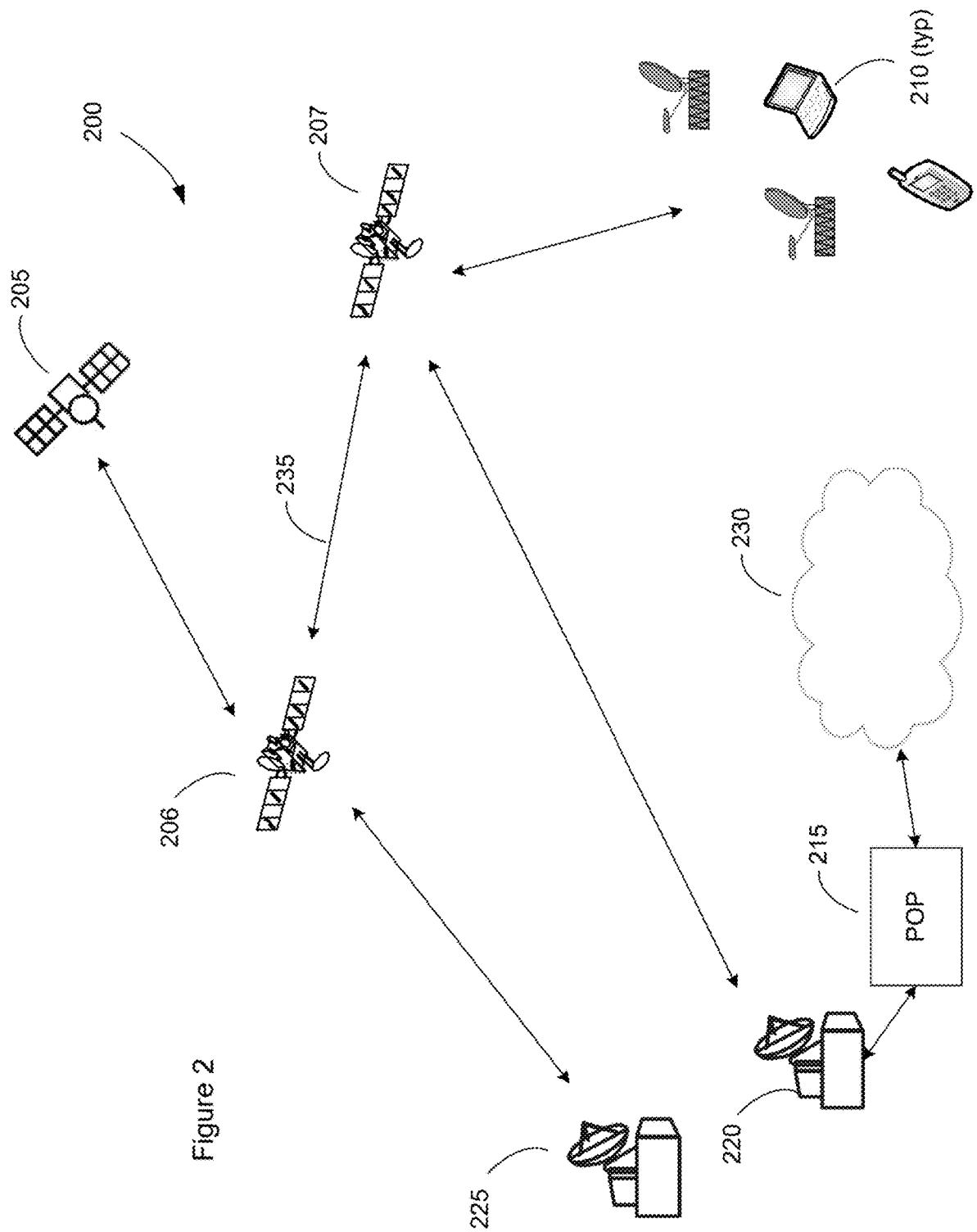
FIG. 2 presents an exemplary system diagram to which the Resource Deployment Optimizer may be applied.

An exemplary network 200 on which the Resource Deployment Optimizer 100 may be implemented is presented in FIG. 2. The satellite constellation 205, 206, 207, user terminals 210, Point of Presence (PoP) hardware 215, gateways 220, Earth stations 225 and ground network 230 form an interconnected global mesh where resource allocation instructions may be transmitted by the system resource management function, based on results generated by the Resource Deployment Optimizer 100. As such, the system resource management functionality and its Resource Deployment Optimizer 100 may lie anywhere in the network 200 and their instructions are distributed throughout the network 200. The choice of the location of these functions in the network 200 may be made in a manner that minimizes cost while maintaining operational accessibility, including the use of distributed cloud-based servers that may have no fixed physical location.

Demand Grid Generator 105

The Demand Grid Generator 105 constructs a demand grid based on demand profile. It generates a list of grid points with associated demand and terminal types, including mobile (demand from aviation and marine terminals) and stationary demands. The grid point number, locations, and demand may vary from one time step to another. The Demand Grid Generator 105 handles both static and time-varying demands and provides inputs to the Constellation Linearizer 115. Typically, the demand grid comprises a table or database, and grid points are entries in that table or database.

Link Budget Recipe Interpreter 110

For each type of terminal, a link budget "recipe" may be supplied with pre-determined inputs (satellite coordinates, user coordinates, signal frequency, fading availability, satellite EIRP spectral density or satellite G/T, satellite C/I, ASI EPFD), link budget equations and resulting outputs (e.g. Signal to noise ratio, spectral efficiency). The Link Budget Recipe Interpreter 110 extracts link budget recipes from the input and compiles them into a sequence of computational tasks (the "Pre-compiled Link Budget Recipe") that may be executed in vector format on a quantity of links (which may support hundreds of millions of links) by the Constellation Linearizer 115. Vector processing (in the sense of a low-level parallelization scheme) was found to be a particularly efficient way of performing these calculations. Prior art resource allocation methods are often based on repetition of a single link budget (i.e. a fixed set of inputs) and therefore cannot handle the large number of terminal-specific link budgets. The advantages of constructing this vector-based method over other prior methods are:

1) flexibility and quick turnaround time in link budget definitions by separating the link budget definition from the link budget execution, and
2) fast execution using a vector-format implementation.

Constellation Linearizer 115

The purpose of the Constellation Linearizer 115 is to characterize potential satellite-to-user links (both uplink and downlink) in terms of their spectral efficiency, and payload power utilization which are the quantities needed to inform the allocation performed by the Allocation Optimizer 120. The Constellation Linearizer 115 may use coarse-grained parallelization to achieve best utilization of resources. Important aspects of this module are as follows:

Each serial process is responsible for instant characterization of the constellation at a single time step;

A large number of independent serial processes are spawned in parallel over a large pool of processors to characterize the constellation at all time steps; and The parallel process generates a throughput of solutions proportional to the number of processors utilized. The number of processors may be scaled to achieve the desired solution throughput. The independence of the tasks and the coarse nature of the parallelization, allows the solution throughput to scale linearly with the number of processors.

Figure 3:
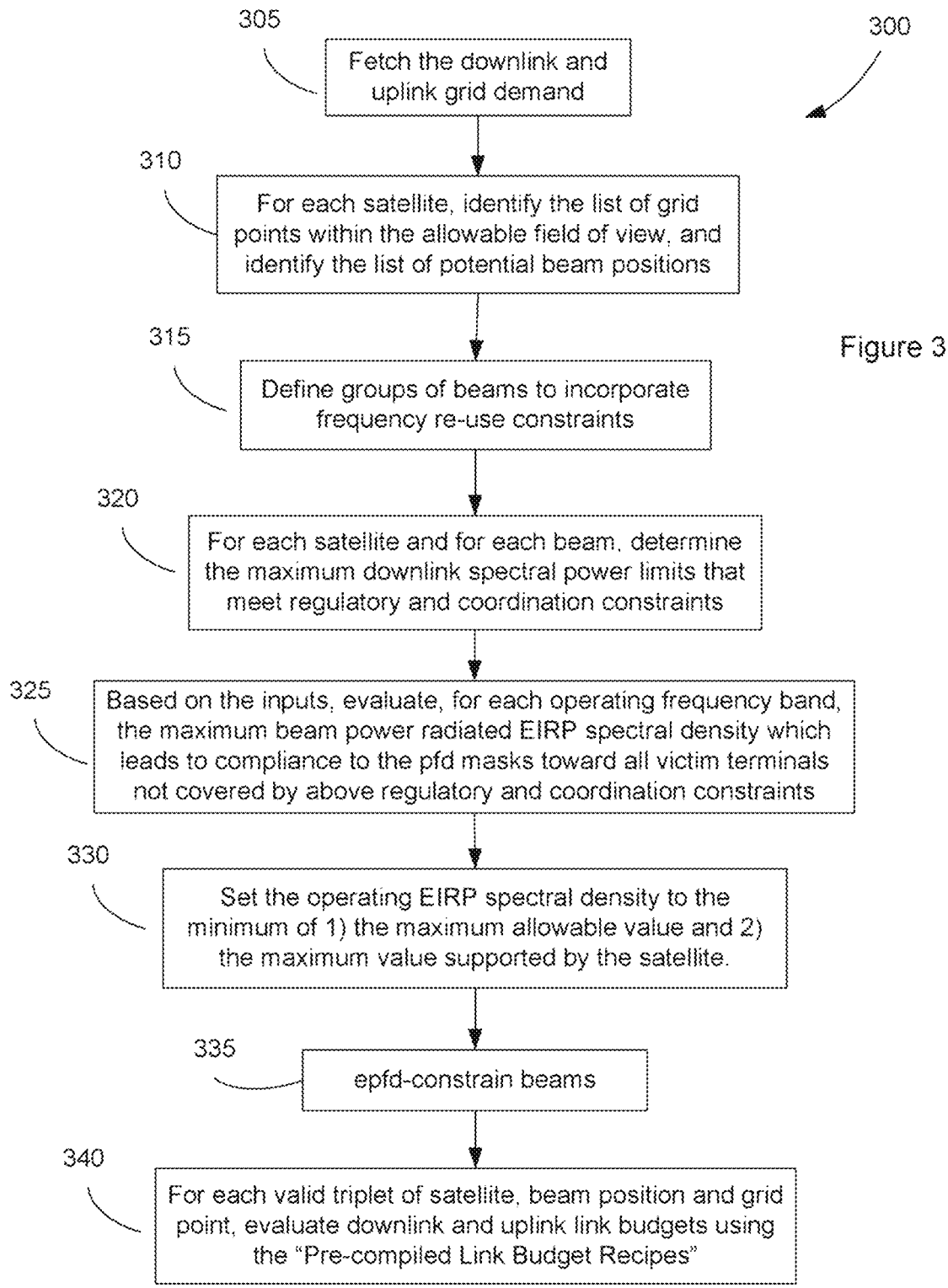
FIG. 3 presents a flow chart of a method of implementing Constellation Linearization in an embodiment of the invention.

Referring to the flow chart of FIG. 3, Constellation instant characterization includes the following tasks:

Fetch the downlink and uplink grid demand from the Demand Grid Generator output 305

For each satellite, identify the list of grid points within the allowable field of view, based on a pre-determined minimum ground elevation for each terminal and each grid-point 310. From a static beam-position layout covering the field of view, identify the list of potential beam positions based on intersecting the beam coverages with the grid points. Alternatively, grid points can be grouped into fixed ground cells which are limited in their size and aggregate demand. In this case, for each satellite, identify all visible fixed ground cells meeting pre-determined minimum ground elevations, and for each identified cell compute the corresponding potential beam position in the satellite field of view.

Define groups of beams to incorporate frequency re-use constraints 315.

We control frequency re-use by limiting the aggregate effective bandwidth allocated in any cluster of beams, defined as a group of beams all fully coupled among each other based on a threshold spacing in the satellite field of view. The methodology is set out in greater detail in Appendix I For each satellite and for each beam, determine the downlink spectral power limits that meet regulatory and coordination constraints 320:

Input constraints: orbital parameters of the higher-priority victim network satellites, power flux density (pfd) masks, victim network ground coverages and associated priority spectrum based on the following:

Other satellite networks may have terminals that must be protected against interference. These terminals are identified as 'victim terminals' and are a constraint for the optimization of the Resource Deployment. Pfd masks contain tabulated data of the allowable instantaneous pfd onto victim terminals as a function of: victim longitude, victim latitude, angular separation between the satellite and the victim's satellite as seen from the victim's point of view.

Instantaneous pfd masks, are generated from multiple time-percentage limits provided as a cumulative-distribution-function (cdf) limit on equivalent power flux-density (epfd) as follows:

Step 1: mapping the time-percentage axis of the epfd cdf data points from the supplied limit function to the angular-separation. Interpolating the statistical cdf of the worst-case-satellite angular-separation over a sufficiently long period of time from.

Step 2: mapping the epfd axis of the epfd cdf to the pdf based on the data points' angular-separations.

The worst-case-satellite, for a given victim terminal at a given time, is defined as the constellation satellite resulting in the smallest angular separation relative to that victim terminal. One example of epfd cdf limit function for which the above method can be applied to derive instant pfd mask, is such as defined by ITU Article 22 for the control of interference to geostationary-satellite systems. In addition, the invention includes a method to define pfd masks which accounts for aggregation of multiple satellites into GSO victim terminals, as detailed in Appendix 11.

Figure 4:
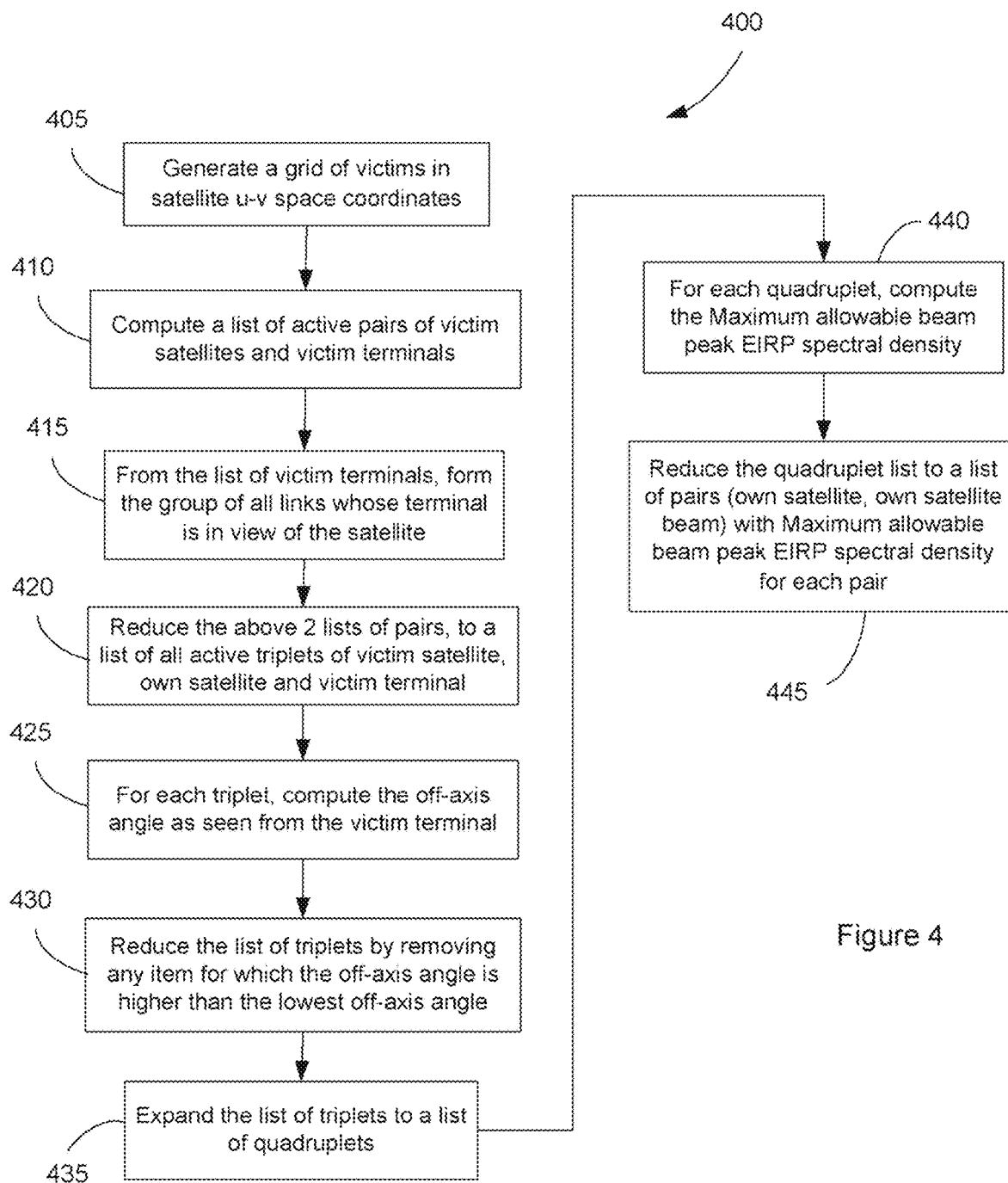
FIG. 4 presents a flow chart of a method of evaluating, for each operating frequency band, the maximum beam power radiated Effective Isotropic Radiated Power (EIRP) spectral density (dBW/Hz) which leads to compliance to the pfd masks toward all victim terminals from a uniform distribution of victims located within the victim network coverages and operating within the same frequency band.

Based on the above inputs, the Constellation Linearizer 115 evaluates, for each operating frequency band, the maximum beam power radiated Effective Isotropic Radiated Power (EIRP) spectral density (dBW/Hz) which leads to compliance to the pfd masks toward all victim terminals from a uniform distribution of victims located within the victim network coverages and operating within the same frequency band 325. This maximum allowable EIRP spectral density is determined as follows, per the flow chart 400 of FIG. 4:

Generate a grid of victims in satellite u-v space coordinates 405

Compute a list of active pairs of victim satellites and victim terminals 410

From the list of victim terminals, form the group of all links whose terminal is in view of the satellite 415. This produces a list of "own satellite", "victim terminal in view".

Reduce the above 2 lists of pairs, to a list of all active triplets of victim satellite, own satellite and victim terminal 420.

For each triplet, compute the off-axis angle as seen from the victim terminal 425

Reduce the list of triplets by removing any item for which the off-axis angle is higher than the lowest off-axis angle among all other items with the same own satellite and victim terminal 430.

Expand the list of triplets to a list of quadruplets (victim satellite, own satellite, victim terminal, own satellite beam) to include all of the potentially needed (at this time step) own satellite beam numbers which are distinct in their directivity toward a given victim for a given own satellite 435.

For each quadruplet 440, compute the Maximum allowable beam peak EIRP spectral density as follows: Maximum allowable beam peak EIRP spectral density="pfd mask evaluated at the victim location and off-axis angle" MINUS "pfd at the victim based on an EIRP spectral density of 0 dBW/Hz" MINUS "beam directivity toward the victim" PLUS "beam peak directivity".

Reduce the quadruplet list to a list of pairs (own satellite, own satellite beam) with Maximum allowable beam peak EIRP spectral density for each pair corresponding to the minimum of all values across all associated quadruplet list items 445.

Note that both GSO (with satellites fixed with respect to the Earth) and NGSO (with moving satellites with respect to the Earth) victim networks can be protected using this method since it only depends on knowledge of the victim satellite positions at a given time, their coverages and allowable pfd masks.

Set the operating EIRP spectral density to the minimum of 1) the maximum allowable value and 2) the maximum value supported by the satellite 330. To reduce the pool of links to only useful links, one may choose to turn off a particular link if the resulting constrained EIRP spectral density falls below a predefined threshold below which the link may not be useful and is unlikely to be utilized by the Allocation Optimizer.

In the real-time operational Constellation resource management system, all beams are static in the satellite view and therefore can be epfd-constrained 335 with as much time ahead as is desired, independent of the location of traffic. AN beams from the satellite view would be pre-constrained, whether or not they contain planned user terminals. Thus, the near-real-time linearization of the new terminals would involve only the following steps:

1. Assignment of (new) grid points to targets
2. Link budget evaluation

The -epfd-constraining of the beams provides flexibility for last-minute addition of terminals and/or demand for real-time operation, with the additional cost associated with computing the power constraint for all beams even though they may not be needed.

For each valid triplet of satellite, beam position and grid point, evaluate downlink and uplink link budgets using the "Pre-compiled Link Budget Recipes" 340 at a pre-defined number of discrete power spectral density levels using a fast vector implementation. Also evaluate the required input RF power spectral density for each link.

Allocation Optimizer 120

The Allocation Optimizer 120 assigns the satellite resources (bandwidth, power, ISL throughputs) and gateway resources, to available links to satisfy the user capacity uplink and downlink demand within the applicable constraints.

The Allocation Optimizer 120 may be run using coarse-grained parallelization to avoid bottlenecks that can occur if other methods such as fine-grained parallelization are used.

Each serial process is responsible for the constellation resource allocation over a number of time steps. If no constraints exist regarding the continuity of connection, then a single time step per serial process may be utilized. If it is desired to constrain the minimum duration of connections, multiple time steps may be integrated as part of each serial optimization process.

Since the goal is to obtain a continuous stream of solutions meeting such continuity constraints while still allowing for parallel processing, we have developed a novel "Venetian Blind" approach where a continuous stream of, for example, 5000×1-min time steps is broken into blocks of 5 time steps (for a total of 1000 blocks), parallel solving for every other block of 5 time steps such that all 500 blocks being solved in parallel are disconnected from each other, and then parallel solving for the remaining 500 blocks interleaved between the first set of blocks.

For example, for a stream of 20 time-steps numbered 1 to 20, time-steps 1 to 5 and 11 to 15 could be placed in a first group of time-steps, and time-steps 6 to 10 and 18 to 20 could be placed in a second group of time-steps. Parallel processing could then be used to optimize time-steps 1 to 5 as an isolated problem, followed by optimizing time-steps 11 to 15, etc. processing all of the time-blocks in the first group of time-steps. The solutions to these optimizations can then be used as boundary-condition constraints for the time-blocks in the second group of time-steps, that is, time-steps 6 to 10 and 16 to 20. Thus, the time-blocks in the second group of time-steps can also be optimized as separate, isolated problems using parallel processing.

Two strategies can be employed.

The first strategy is to enforce a minimum connection duration, for example 2 minutes. In this example, the first set of solves on disconnected time blocks enforces a 2 minute continuity constraint by ensuring that the 'Connection' binary variables remain on for at least 2 consecutive time steps during the 5 time-step block, except for the first and last time steps from the block, which are allowed to contain single-time-step connections for links provided that they are known to be available based on the Constellation Linearizer 115 outputs at the time steps immediately preceding and immediately following the 5 time-step time block being optimized. In the second set of solves on the interleaved time blocks, hard constraints are set on the Connections which only last a single time step in immediately adjacent solved time blocks.

The second strategy is to promote connection continuity by minimizing the number of connection changes incurred by any grid point during the 5 time-step block. This is done by including a secondary objective (either using a low weight in a weighted objective approach, or using hierarchical objectives). In the previous description, the time step period (1-min) can be replaced by any other period. Similarly, the block size (5 time steps) can be chosen differently (e.g., 10 time steps). Finally, for strategy 1 the required number of consecutive steps per connection could be different than 2. This second strategy is the preferred one, since by not enforcing hard constraints we avoid the risk of creating side effects such as throughput reductions.

The main interest of the "Venetian Blind" approach is to maintain parallelizability of the compute process while enabling terminal connection continuity. The alternative would be to simulate each block serially, which could potentially yield longer connection times. As an example, the "Venetian Blind" approach with blocks of 5 minutes (5 steps×1 min) would practically limit connection duration to 10 minutes, but as long as this duration is close to the maximum duration of a satellite pass or is practically sufficient in terms of quality of service, the small compromise relative to the serial approach is worthwhile.

This "Venetian Blind" approach may be employed in an operational system by selecting any spacing between time samples to obtain the base solution with enforced connection continuity, and a rapid bandwidth assignment re-optimization would be performed to generate the in-between time samples at 1 second intervals, using the known Connections from adjacent samples. This process would enable pure LP solves without integrality constraints, thereby providing significant speed up of the in-between time solves as compared to the original set of solves.

Figure 8:
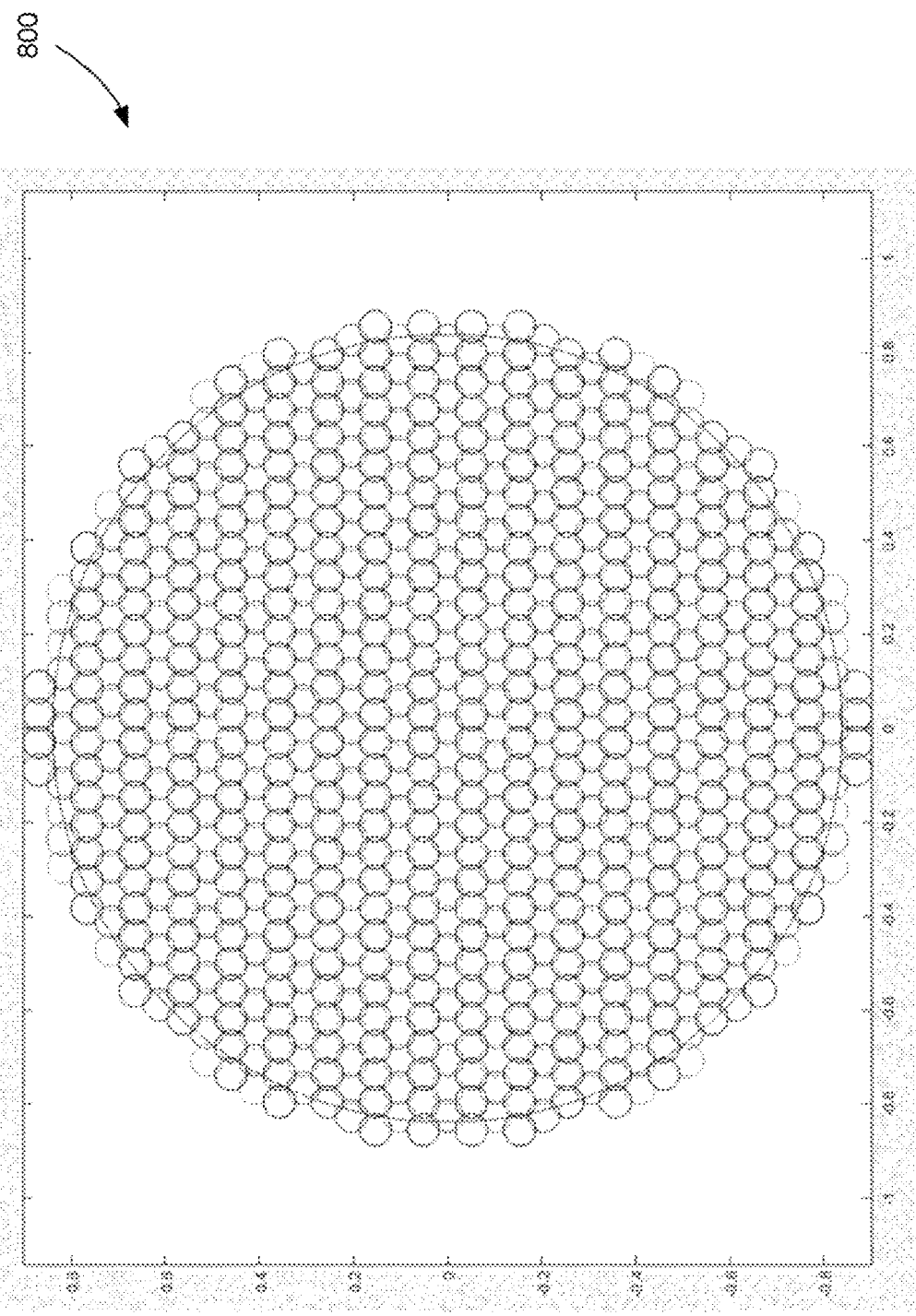
FIG. 8 presents an exemplary static beam layout.

Resource assignment optimization is performed on both satellite assignment and beam assignment. Satellite assignment can be performed on individual grid points or on cells, where a cell is a group of grid points located in a circumscribed zone on the ground. If satellite assignment is performed on individual grid points, beam assignment must also be performed on individual grid points. If satellite assignment is performed on cells, beam assignment can be performed either by cell or by individual grid point. If beam assignment is performed by cell, a large number of beam positions may result and this may unnecessarily drive up the number of required beam positions (beam hops in case of a beam hopping system) and the number and complexity of frequency reuse constraints. For this reason, the preferred approach is to perform beam assignment by individual grid point. In this method, grid points are used to drive the selection of potential satellite beam positions from a static layout of beams in the satellite field of view. This method achieves the maximum steering range to each terminal and it avoids artificially creating bottlenecks in payload beam count utilization and frequency reuse constraints which are not actually driven by demand. When performing beam assignment by individual grid point, the static layout of beams in the satellite view may be a regular lattice layout as shown in FIG. 8, or any other lattice which may for example include a progressive reduction of the beam coverage diameter as the scan angle increases, to limit the impact of squint in a direct radiating array (DRA) implementation of the user beams.

Resource allocation optimization may be performed using a mixed integer programming (MIP) solver.

The following unknowns are defined:
B is a vector containing the allocated bandwidths for each one of the $N_{links}$ available links as generated by the Constellation Linearizer. Importantly, the B unknowns are normalized to the total quantity of locally-available spectrum—this scaling improves the problem conditioning and reduces LP solve time.

Connection is a binary vector variable with $N_{links}$ elements. It represents the state of a link, 0 if unconnected and 1 if connected.

S is a real vector variable with $N_{links}$ elements. It represents the individual grid point satisfaction, defined as the ratio of delivered throughput over the capacity demand of that grid point.

$S_{min}$ is a real scalar variable which represents the minimum satisfaction across all terminals.

The following constraints form part of the mixed-integer program:
Frequency re-use constraints: on each satellite, for each beam cluster, limit the aggregate bandwidth assignment to the aggregate amount of locally-available dual-polarized spectrum.

For each satellite and beam, limit the number of active discrete power levels to 1

For each grid point, the total number of connections must be 1. This is enforced by constraining, for each grid point, the sum of all Connection variables associated with that grid point to 1.

For each satellite, limit the aggregate of all input power from all links for which bandwidth is allocated to be less than equal to the total available radiated RF power on that particular satellite. The input power required for each link is obtained by multiplying the pre-computed RF input power spectral density by the allocated bandwidth, based on the B vector variable.

For each satellite, limit the aggregate downlink and uplink throughput to the processor downlink and uplink throughput capabilities, respectively.

For each satellite, limit the total allocated fractional beam count to the number of beams available on the beamformer. Each active link contributed a fractional beam count equal to the ratio of its allocated bandwidth to the maximum instantaneous bandwidth of a beam.

Define a linear equation linking the allocated bandwidth B and the satisfaction S:

$$S=[x2S]\times B$$

Define a linear inequality to obtain the minimum satisfaction $S_{min}$ from the vector of gridpoint satisfaction S:

$$S_{min}<=S_k, \text{ all } k$$

Figure 5:
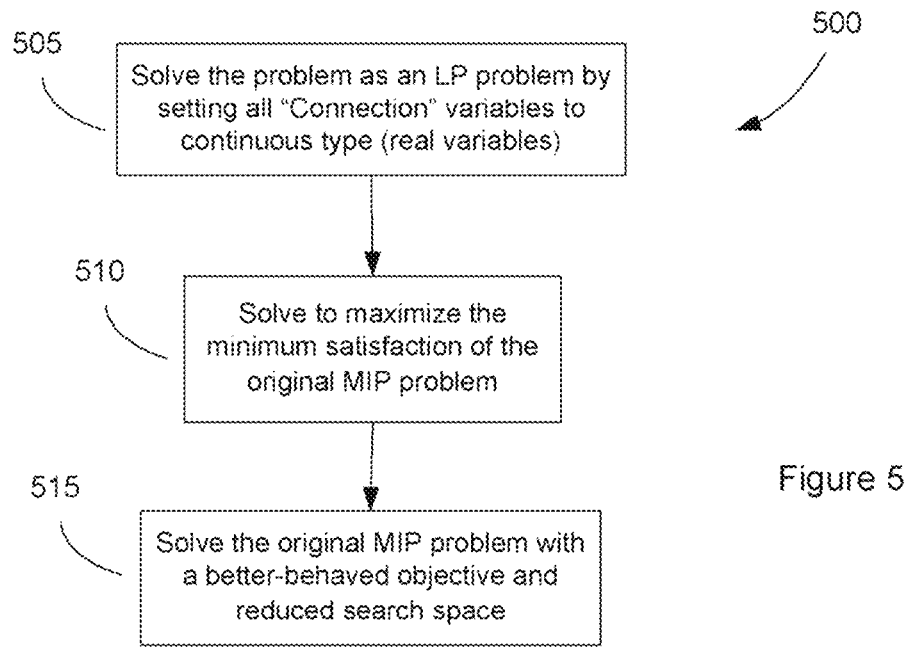
FIG. 5 presents a flow chart of a method of simplifying the objective prioritizing minimum satisfaction problem.

Multiple types of optimization objectives are used in this invention, depending on the goal sought. Exemplary optimization objectives can be grouped as follows:
1) Objective prioritizing minimum satisfaction
   For each time step, the objectives, in order of priority, are to first maximize minimum satisfaction, then maximize average satisfaction and lastly maximize aggregate capacity
   a Implement objective as a combination of the above with large weight (100×) on the $1^{st}$ sub-objective and small weights (1×) on the $2^{nd}$ and $3^{rd}$ sub-objectives The objective above, heavily-weighted on the maximin problem, may take an impractical amount of time to solve. As part of this invention, we deconstruct the problem into 3 sequentially-solved problems. Referring to the flow chart of FIG. 5:
   Step 505: Solve the problem as an LP problem by setting all "Connection" variables to continuous type (real variables)
   Result will have fractional satellite allocations which will add up to 1 per grid point
   Solution will provide an upper bound fitness to the true solution. Call this the "relaxed solution"
   Solution may contain a mixture of "certain" Connections (defined as those Connection variables with a value of 1 in the solution) and "fractional" Connections (defined as those Connection variables with a value between 0 and 1 in the solution).
   Step 510: Solve to maximize the minimum satisfaction of the original MIP problem From the relaxed LP solution, extract the relaxed minimum satisfaction Re-cast the LP problem by binding the satisfactions of all grid points to a unique satisfaction level (single variable). Set an upper bound this uniform satisfaction to the value of the "relaxed minimum satisfaction"

Freeze all "Connection" variables that were found to be "certain" (i.e. have a value of 1) in the relaxed solution, that is convert these variables to constants in the formulation by setting both their lower and upper bounds to 1. This reduces the number of unknowns to solve for.

Re-introduce integral constraints on the remaining non-frozen "Connection" variables, i.e. make them binary again Solve reduced MIP problem to maximize the uniform satisfaction. This is the exact minimum satisfaction of the original MIP problem.

Step 515: Solve the original MIP problem with a better-behaved objective and reduced search space set minimum bound on all grid-point satisfaction levels equal to the minimum satisfaction solved for in the reduced MIP problem change objective to exclude the "maximize minimum satisfaction" sub-objective.
 Objective is made to be an equal-weighted combination of the "maximize average satisfaction" and "maximize aggregate capacity" sub-objectives Freeze all "Connection variables" that were found to be "certain" in the relaxed solution, as in Step 2.

Tighten the bounds of the individual grid point satisfaction levels to the satisfaction levels achieved in the relaxed solution—this reduces the search space and speeds up the MIP solve.

Solve MIP problem. This will solve much faster than the original problem because we have replaced the maxi-min objective with a known minimum bound.

2) Objective balancing minimum satisfaction and average satisfaction

This weighted objective gives equal weight to maximize the minimum satisfaction and the average satisfaction across all grid points. It has good convergence properties especially when running with a feasible or quasi-feasible capacity demand grid.

Therefore, it requires no special procedure and can be performed using a straight MIP formulation. This objective type is most appropriate for real-time allocation of resources on a pre-conditioned demand grid which is known to be feasible or quasi-feasible.

Note that in this method, average satisfaction can be replaced with the aggregate capacity ratio, which is the ratio of delivered aggregate capacity to aggregate demand. Alternatively, average satisfaction can also be replaced with the aggregate revenue ratio, which is the ratio of aggregate revenue to aggregate potential revenue. For this purpose revenue is calculated based on a gridpoint-based weighting of delivered throughput. In this method, we may also replace average satisfaction with any weighting of the point-by-point delivered throughput.

3) Objective balancing average satisfaction and aggregate capacity ratio or aggregate revenue ratio This type of objective has very good convergence properties. It is not well suited in operational scenarios because it often leads to occasional null-satisfaction conditions on some grid points due to the fact that maximizing the minimum satisfaction is not part of the objective due to the finite practical convergence tolerances on this objective. It is best utilized in non-operational scenarios when performing demand conditioning or relaxation.

Demand Conditioner 125

Capacity demand is the need for sustained capacity delivered to a given terminal.

A given demand grid distribution may not be achievable for a given constellation design. For example, it is possible that: 1) the instantaneous individual-terminal or regional aggregate capacity demand may be beyond the constellation capability, or 2) it may not be feasible to cater to the demand on a continuous basis (unsustainable demand). Although in an operational system, one would typically feed the System 100 with a pre-conditioned demand which is feasible under nominal conditions. The Demand Conditioner 125 addresses this problem by conditioning (relaxing) the demand profile to the constellation design in order to define a feasible demand grid that can be met. This feasible demand grid can be used as the input in the real-time operational Constellation resource management system.

Two methods are utilized alternatively for demand conditioning: continuous demand relaxation and discrete demand relaxation. Continuous demand relaxation seeks to find a feasible point-by-point demand given a pre-defined complete set of point-by-point throughput demand, which optimizes the objective function. Continuous demand relaxation consists of setting the point-by-point relaxed demand equal to a weighted average of:

1) the time-averaged point-by-point delivered capacity as computed over a finite window of preceding time steps, typically 100 to 1000.

2) the time-averaged point-by-point relaxed demand over the same finite window of preceding time steps.

The sum of the weights applied to terms 1 and 2 above must equal 1. A higher weight on term 1 results in a faster convergence of the relaxed capacity, while a higher weight on term 2 generally results in a higher aggregate relaxed capacity, at the expense of time. The weighting is chosen based on the time available for the Demand Relaxation process.

Figure 6:
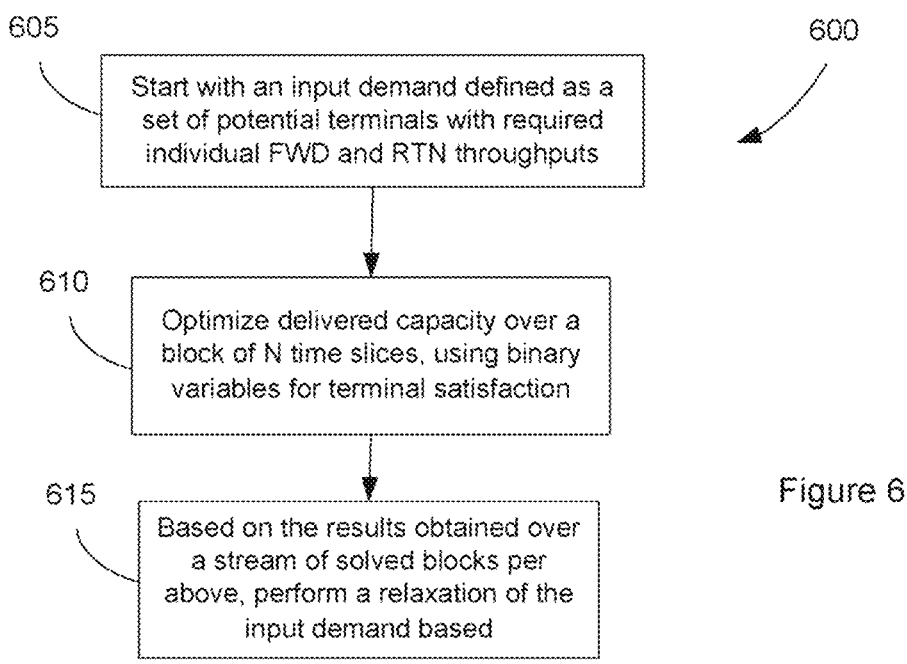
FIG. 6 presents a flow chart of a method of Demand Relaxation in an embodiment of the invention.

By contrast, discrete demand relaxation consists of finding a feasible sub-set of the original point-by-point demand which optimizes the objective function, by decimating (if necessary) some of the grid points from the original set without changing the original throughput demand at the remaining grid points. The method is as follows, per the flow chart of FIG. 6:

Start with an input demand (which may represent an addressable market) defined as a set of potential terminals with required individual FWD and RTN throughputs 605.

Optimize delivered capacity over a block of N time slices, using binary variables for terminal satisfaction 610. Optimal selection of terminals is made to maximize the desired metric (e.g. incorporating one or more weighted objectives such as: aggregate capacity, average satisfaction, aggregate revenue, etc). This step is run in parallel over multiple blocks of N time slices each.

Based on the results obtained over a stream of solved blocks per above, perform a relaxation of the input demand 615. Compute the cumulative distribution function (cdf) of the selection frequency of each terminal over the tested time stream. The relaxation consists of selecting the terminals which belong to portion of the cdf below a cumulative percentage threshold such that a target amount of capacity demand is removed. This target amount of removed capacity demand is set as a specified fraction (e.g. 50%) of the gap between the achieved time-average aggregate capacity and the aggregate capacity demand.

Both demand relaxation techniques allow for a significant improvement of the aggregate deliverable capacity by gradually freeing satellite resources that were deployed toward unsustainable demand and re-deploying them toward other demand which can be sustained over time. The end state of this process provides a feasible demand profile and an efficient deployment of existing satellite resources toward this feasible demand.

In addition, demand relaxation can be used to simplify the objective function utilized in the Allocation Optimizer 120 and provide large reductions in computing time. This is done by re-formulating the Allocation Optimizer 120 as a single-step approach with a Linear Program incorporating both continuous and discrete variables, and by re-writing the objective function to simply maximize the aggregate delivered capacity without constraining the minimum terminal satisfaction. During the relaxation process, individual time step solutions will contain grid points with no delivered capacity since the optimization will seek to first fill demand from the terminals having the highest instantaneous spectral efficiency. However as the demand profile relaxes toward a feasible state, each terminal demand will be reduced toward a level consistent with the range of spectral efficiencies it experiences over time, and when a feasible state is reached, all terminals will have been assigned capacity in line with their respective relaxed demand levels. Spectral efficiency is the ratio of throughput in bps to allocated bandwidth in Hz. This ratio varies as a function of ground elevation to the satellite and therefore varies with time. A feasible demand has to work with the achievable range or spectral efficiencies consistent with constellation geometry and terminal characteristics. This approach has the combined advantages of achieving better aggregate delivered capacity while reducing the burden on the Allocation Optimizer 120 and significantly reducing computation time.

Demand relaxation of a Capacity Pool can also be performed:
  A Capacity Pool is defined as a group of grid points either spanning a region or otherwise connected by similar business which collectively use a fixed aggregate amount of constellation capacity (in Mbps).
  Satisfaction of the Capacity Pool Demand is assessed by running a time-varying capacity analysis where the instant demand distribution over the Capacity Pool grid points is randomly assigned at each time step while keeping the total instant demand equal to the Capacity Demand Envelope. Satisfaction relative to the sustained demand is evaluated by computing the ratio of the delivered Pool Capacity to the Capacity Pool Demand.
  The Capacity Demand Envelope is conditioned using the same Demand Relaxation method used on grid-point capacity, but applied to Pool Capacity.
  The conditioned (or relaxed) Capacity Demand Envelope is called the Feasible Capacity Demand Envelope, and it can be used as an input in the system.

Slack Capacity Demand 130

Demand which is known well in advance may be booked in the Allocation Optimizer 120. A second-stage optimization is added to the first-stage optimization in order to book a layer of additional demand, called "Slack Capacity Demand", on top of the baseline demand and on a secondary priority basis, where remaining constellation resources allow. The distribution of this additional demand layer can be informed by available insights into possible additional demand that one may have or last-minute environmental changes, but could also be a uniform layer of homogeneous demand where no additional data exists. This will prevent the clustering of satellite resource utilization and improves the likelihood that short-term unforeseen demand can be met with minimal configuration changes to the constellation resource deployment. The primary mechanism for meeting short-term unforeseen demand is then to assign portions of the allocated "Slack Capacity" for this new demand, a mechanism which does not require running a global resource optimization.

Route Generator 145

Both forward and return links to user terminals must be routed to a Point of Presence (PoP) which is the physical ground site where the customer connects. Each link is comprised of the following components (see FIG. 2):
  Ground connection from the PoP 215 to a gateway/landing station 220
  From the gateway/landing station 220 to the landing station satellite 206 through a satellite antenna beam, which is the satellite directly connected the gateway/landing station 220
  Optionally from the above satellite 208 to another satellite 207 through an ISL connection 235, and subsequently through any number of satellites through the constellation ISL mesh, all the way to the "user satellite" 207, which is directly connected to the user terminal 210
  From the "user satellite" 207 to the user terminal 210 using a satellite antenna beam The following goals must be achieved for the overall set of links supported by the constellation:
  Minimize the overall link latency or meet a maximum latency goal or requirement, which is achieved by a proper initial selection of suitable candidate links combined via penalization for latency as part of the link selection in the Allocation Optimizer 120;
  Minimize the overall link jitter or meet a maximum jitter goal or requirement, which is achieved via penalization for jitter as of the link selection in the multi-time-step mode of the Allocation Optimizer 120;
  Ensure no congestion in any of the constellation Inter Satellite Links (ISL) 235 by constraining the aggregate of the allocated link throughputs for all groups of links with common ISL segments. ISL 235 are connections made amongst satellites in a constellation.

Link Route Generation

A predetermined list of globally distributed PoPs 215 is provided. Each user terminal 210 has an assigned PoP 215 as an input to the problem. Based on the terminals 210 in its field of view, we determine for each satellite 205, 208, 207, PoPs 215 it potentially may need to connect to.

For each satellite, we first generate an inventory of N links connecting the satellite 205, 208, 207 to each one of its potential PoPs 215 with the N links yielding the least PoP to user latency. This is achieved from either one of 2 methods: 1) Dijkstra's algorithm or 2) an MIP-based method with latency-minimizing objective.

Link Allocation Optimization

In addition to allocating the satellite resources to the user links, the Allocation Optimizer 120 can optimally select the best combination of link routes (from the pre-generated inventory of links) to meet the overall goals while maximizing constellation capacity and customer satisfaction. The additional constraints added to the Allocation Optimizer 120 for this purpose are:

- the aggregate throughput supported by all active links from a given PoP 215 to a given user satellite 207 must match the total throughput delivered to all users assigned to that PoP 215 from this satellite. This applies in both the forward downlink and return uplink directions.
- the aggregate throughput of all active links going through a given ISL 235 on the constellation must be equal or less than the ISL 235 throughput capability;
- the aggregate bandwidth required to support all active links going through a landing station/satellite beam must not exceed the total bandwidth assigned through that beam. This applies in both the forward uplink and return downlink directions;
- optionally, the latencies of the active links can be mixed into the LP optimization objective, with the goal of minimizing latency without unduly affecting throughput;
- optionally, jitter can be minimized by running the multi-step version of the Allocation Optimizer 120 and penalizing changes in latency from a PoP 215 to a given user through a modification of the LP optimization objective.

The MIP that addresses all of the above can be computationally intensive. One way to reduce the problem's complexity is to first run the Allocation Optimizer 120 to allocate satellite user resources only, and then re-run the Allocation Optimizer 120 to optimize the full link selection with the satellite user resources frozen. This will reduce the complexity of the MIP problem to solve, in exchange for some impact on the quality of the solution in terms of latency.

Fading Analysis and Mitigation 150

Rain fade or rain attenuation is a major known challenge in satellite communication, where presence of rain causes weakening of signals. Link rain fading is traditionally booked on the basis of long-term availability based on the International Telecommunication Union (ITU) fading recommendations. The standard way to address rain fade has been to account for rain fade on every link. In the present system, in order to efficiently deploy constellation resources, rain fade is not systematically booked on every link. Rather, the historical constellation performance is simulated using a historical set of rain rate global distribution, and resource allocation is then optimized based on a simulated rain rate global distribution forecast, using the following approaches for downlink and uplink:

1) Downlink: at every time step, generate link budgets booking fading based on rain rate forecast 135 and allocate additional satellite power spectral density called "fading offset" (subject to the pfd mask limit) based on a predefined function of the fading. Use these link budgets as input to the Allocation Optimizer 120 which optimally deploys the available satellite beam power and bandwidths accounting for the fading and partial or complete fading offsets. The actual link budgets are then re-run booking fading based on the actual rain rate. The Allocation Optimizer 120 can then be re-run using the actual link budgets while keeping the satellite link selection frozen based on the first optimization based on forecasted link budgets. This second stage optimization optimally adjusts the allocated satellite beam bandwidths accounting for the actual fading, taking into account the quasi real-time modcod selection based on real-time signal to noise ratio. The constellation performance is then calculated based on the combination of the second-stage resource allocation and the actual link budgets. The pre-defined function used to generate the fading offsets is tuned based on simulation results to balance the need to offset fading with the need to limit the impact of these offsets on other un-faded links due to pressure on the satellite resource. Alternatively, if multiple power spectral density settings are used in building the set of usable links, this offset fading tradeoff can be left to the Allocation Optimizer 120.

2) Uplink: at every time step, generate link budgets booking fading based on rain rate forecast and allocate ground terminal power to all terminals (fading and non-fading) to improve the faded links by reducing interference impairments due to other (non-faded) terminals at the expense of the link performance of non-faded terminals. Use these link budgets as input to the Allocation Optimizer 120 which optimally selects the optimal set of satellite links. The actual link budgets are then re-run booking fading based on the actual historical rain rate. The Allocation Optimizer 120 can then be re-run using the aa link budgets while keeping the satellite link selection frozen based on the first optimization based on forecasted link budgets. This second stage optimization optimally adjusts the available satellite beam bandwidths accounting for the fading and adjusted ground terminal power levels, taking into account the quasi real-time modcod selection based on real-time signal to noise ratio. The constellation performance is then calculated based on the combination of the second-stage resource allocation and the actual link budgets.

Likewise, a real-time constellation resource manager is implemented based on the above strategy using real-time data 140 and short-term forecasts of the rain rate global distribution.

Frequency Plan/Time Slot Assignment Generator 155

The role of the Frequency Plan/Time Slot Assignment Generator 155 is to find, for a given satellite and time step, a feasible 2D assignment of frequency and time slot to meet the Effective Bandwidth allocations performed by the Allocation Optimizer 120. This problem is formulated as a small-scale MIP problem which is solved independently for each satellite and time step, enabling massive parallelization of this task.

The Frequency Plan/Time Slot Assignment Generator 155 runs as a parallel process with each task related to one satellite at one time step. The output of the global optimization performed by the Allocation Optimizer 120 is the Effective Bandwidth allocation on all available links with each link associated to a specific satellite and beam position. The Effective Bandwidth allocation represents the product of the bandwidth and dwell time allocation for each link, and incorporates reuse constraints which guarantee the feasibility of the frequency/time slot plan.

The advantage of separating the assignment of bandwidth (which is performed by the Allocation Optimizer 120) from the generation of the frequency plan/time slot assignment is to drastically reduce the number of unknown variables that must be solved for the in Allocation Optimizer 120. Allocation Optimizer 120 is responsible for global optimization of the system whereas the Frequency Plan/Time Slot Assignment Generator 155 performs a local optimization.

Modeling Stranded Bandwidth

Normal beam bandwidth allocation is done using continuous variables, which assumes that allocation granularity has no effect on aggregate capacity. This approach neglects any stranded effective bandwidth due to the finite granularity of allocated beam bandwidth, which could be driven for example by the number of beam hops per cycle in a beam hopping system. This granularity may be modeled by utilizing integer variables for beam bandwidth variables. Each unit of bandwidth then represents the smallest unit of incremental effective beam bandwidth (which is the product of instantaneous beam bandwidth with hop fraction) that can be allocated in a given logical beam.

Beam Squint Management

Using steerable electronic beams produced using antenna arrays over a wide frequency band results in "beam squint", whereby the actual scan angle of the beam is a function of frequency. The typical approach to manage the impact of the squint effect is to limit the angular extent over which the beam is utilized to a small fraction of its 3 dB beam width, for instance by aiming the beam toward fixed-sized ground cells whose angular size in the satellite field of view shrinks with scan angle. This approach has the disadvantage of inefficiently utilizing each beam, and causing the need for more beams (or beam-hops in a hopped beam system). Instead, our method consists of managing the assignment of frequencies to terminals based upon their actual location relative to the center-frequency beam position. For example, a user located at a higher scan angle relative to the center-frequency beam position would get assigned a high-frequency channel, while a user located at a lower scan angle relative to the center-frequency beam position would get assigned a low-frequency channel. This method allows one to utilize the full extent of the 3-dB beam width by effectively limiting the extent of the squint to the reduced spectrum allocated to each user.

Cell Grouping

This method groups terminals into fixed ground cells where cell members are jointly connected to a common satellite at any given time. This can lead to computation speed-ups and/or have operational advantages. Note that members of a given cell do not necessarily need to be connected to a common beam although they are connected to a common satellite. The geographical extent of a cell on the Earth is normally limited such that the lowest-altitude satellites can illuminate the entire cell using a single, focused beam.

Finite Target Count Constraint (to Represent Finite Beam Count with No Beam Hopping)

In a constellation whose satellites can support a constrained set of beam positions, such as when no beam hopping is supported, the System 100 may incorporate one additional constraint: the number of beam positions (called targets) allowed at a given time. This constraint is an integer constraint in that we need to enforce that the discrete set of beam positions utilized does not exceed the limit.

The normal MIP search uses generic rules for branch selection in beam target selection. Instead, our method is to set branch priorities based on each beam target's capacity demand, on the basis that the higher-demand beam targets are more likely to have a high impact on node feasibility. This method significantly speeds up the search.

To reduce the time spent searching for feasible and most optimal solutions in the global search tree, the number of branches can be reduced significantly by producing for each satellite and time step a reduced list of beam-selection configurations obtained via independent MIP optimizations, based on a fitness criterion closely tied to the global objective and optionally adjusting objective weights to any grid point based on the number of satellites with available links to that grid point.

Availability Optimization Methodology

In addition to optimizing for aggregate clear-sky capacity, our system includes the ability to optimize for the long-term link availability under fade according to commonly used fading models. This is done as follows:

characterize the long-term availability of each instantaneous link;

optimize the link allocations over a multi-time-step block to maximize the time-averaged long-term availability of the chain of links to any given terminal. This is done in tandem with clear-sky capacity optimization using weighted objectives and/or hierarchical objectives.

Formulation as a Network Flow Problem to Speed Up Resolution as Compared to MIP Formulation Formulation of the constrained throughput delivery problem requires integer variables for the assignment of terminals to satellites. Due to a number of satellite constraints (e.g. beam bandwidth, frequency reuse constraint, available radiated RF power) which involve non-unitary coefficients and constants, Mixed Integer Linear Programming is normally utilized with binary variables for the assignment of terminals to satellites. Due to the large number of such binary assignment variables, compute time is largely driven by the branch and bound search process used to discover the fittest combination of assignments. Instead, we can represent the entire problem as a network flow problem where the flow value represents the number of links, and approximate all of the above-mentioned constraints by flow-capacity constraints which have unitary coefficients and integer constants. This can be solved by the simple use of a linear programming solver without the need for integrality constraints on the flow variables, and nonetheless results in integral values for the user-to-satellite assignments. To perfectly align the resolution with the original set of constraints, the process is performed repeatedly with an update of the approximate flow constraints at every iteration, until convergence. This method is applicable to the full problem including end-to-end routing from the POP through the gateway and satellite. It avoids having to force integral constraints on link selection (for satellite-to-user assignment), and thus avoids long search tree. Problem solves as a pure Linear Programming problem rather than Mixed Integer Programming problem. For the no beam hopping case or in applications involving steerable antennas, the invention has a hybrid version MIP used for beam position selection, while a network flow formulation is used for link selection (satellite-to-user assignment).

"Rolling Carpet" Methodology

Figure 7:
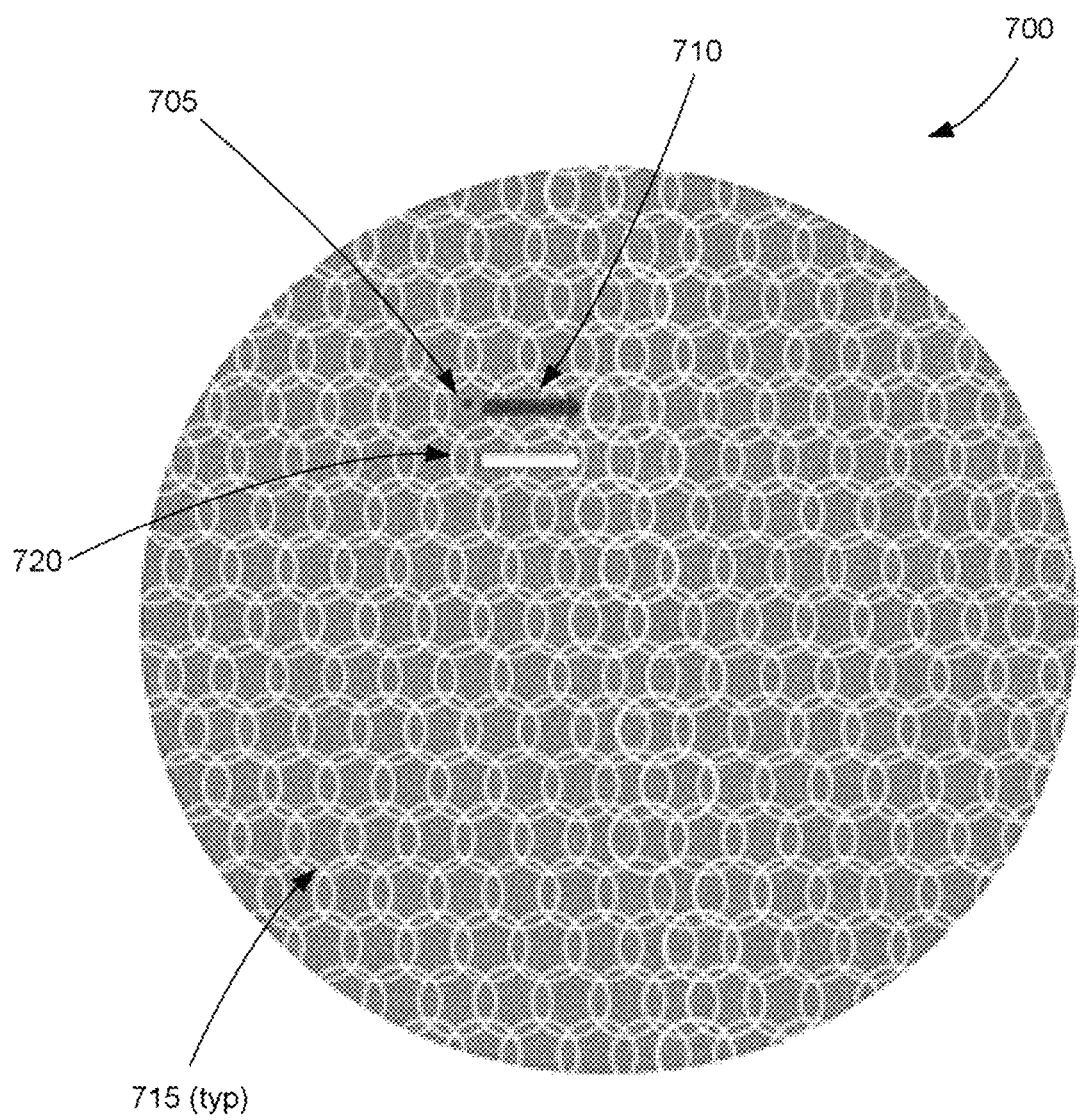
FIG. 7 presents a schematic diagram of an exemplary beam layout, showing how the rolling carpet methodology may be implemented.

This invention includes a method 700 of devising a satellite-view beam layout (as shown in FIG. 7) whose pattern moves along in deterministic curves following the same general direction as the apparent movement of a uniform distribution of fixed terminals as seen from the satellite. This method has the following advantages:

it provides a means to limit the frequency of beam handoffs (and hence frequency handoffs) undergone by a terminal connected to a given satellite; and it minimizes the number of simultaneous instantaneous beam positions handled by a given satellite, hence reduces the number and complexity of frequency reuse constraints.

Referring to FIG. 7, a terminal as seen in the satellite view is identified at point 705. From the perspective of the satellite, the terminal 705 will appear to move to the right

710. The multitude of circles 715 in FIG. 7 represent the array of addressable beam positions at a given time. Per arrow 720, we assume that the addressable beam position should switch to the right at the same speed as the terminal apparent movement, minimizing the number of terminal beam transitions. To improve matching of terminal apparent vector velocity, a curvilinear beam layout can be devised whose beam rows are flowing along the lines of apparent movement of fixed ground targets. That is, the terminal 705 which appears to move to the right 710 in the satellite view, will actually appear to move in a slightly curved direction. This curve can be built into the System.

APPENDIX I—FREQUENCY REUSE

To simplify the frequency reuse for NGSO satellites, user beams are laid out in a static pattern in the satellite field of view. Two key metrics, beam width and beam spacing, define the beam layout. To achieve full coverage the following method is used:

Given.

$B_w$: Beam width in degrees $B_S$: Beam spacing in degrees $U_{Delta}$: Horizontal shift between beams in the same row in UV space $V_{Delta}$: Vertical shift between beams in adjacent rows in UV space $U_{Offset}$: Horizontal shift between beams in adjacent rows in UV space Then, $$U_{Delta} = 2 \times \sin\left(\frac{B_s}{2}\right)$$

$$V_{Delta} = U_{Delta} \times \sin(60°)$$

$$U_{Offset} = U_{Delta} \times \cos(60°)$$

Full coverage is achieved when, $B_s \leq B_w \times \cos(30°)$

An example of this layout 800 is shown in FIG. 8.

$B_s$ can be reduced for a denser layout which will result in higher overall beam directivity. Additional appropriately sized gateway beams (that operate in the same spectrum) are added to this layout maximizing beam directivity.

An alternative beam layout method is to have fixed ground cells. Circular cells of fixed diameter that correlate to the designed satellite beam size are optimally placed around the Earth to cover all user terminals with the least number of cells. Additional appropriately sized getaway cells (that operate in the same spectrum) are added to this layout maximizing beam directivity. This cell layout does not move relative to the ground, beams are directed to cover these cells. This method brings complexities to frequency reuse constraints with larger interfering groups (particularly at low elevation) but is advantageous in beam directivity.

Regardless of the layout method, beams are assembled into beam-coupled groups required to define the frequency reuse scheme. Pairs of interfering beams are defined, and the Bron-Kerbosch maximal clique algorithm is used to generate the set of largest interfering groups. These groups are constrained to share the allocated spectrum.

APPENDIX II—PFD MASK GENERATION

The standard approach for downlink PFD mask generation for compliance with ITU Article 22 is to first synthesize masks based on the 100% epfd limit, then to manually reduce these masks until they meet the requirement for the entire epfd cdf as per Article 22. Instead, we invented a new method to quasi-optimally synthesize a set of pfd masks to meet all time-percentage limits of Article 22. This quasi-optimal synthesis enables a satellite operator to use to the maximum extent possible the allowed epfd cdf. Our new PFD mask synthesis method of PFD mask generation fully accounts for epfd aggregation from multiple satellites as defined by ITU Recommendation 1503-2.

Figure 9:
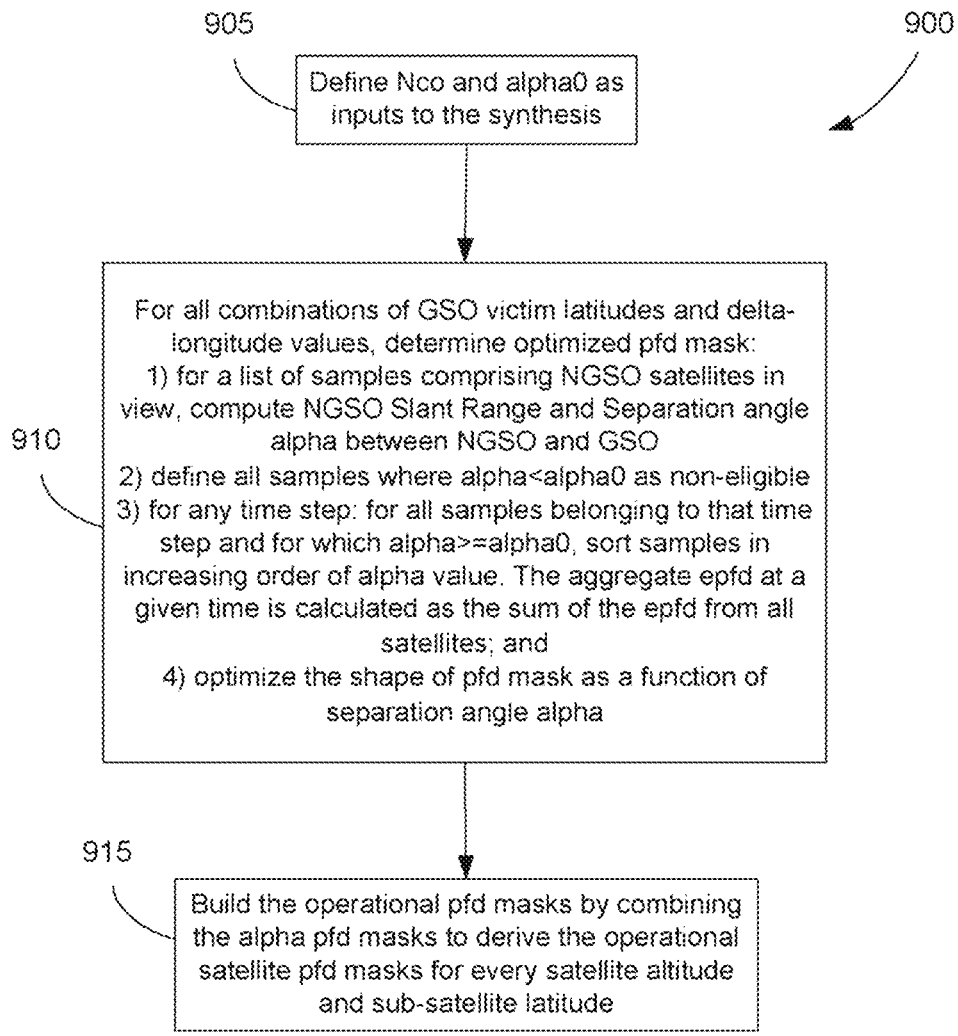
FIG. 9 presents a flow chart of a method of PFD mask generation in an embodiment of the invention.

Our method follows the following steps (referring to the flow chart 900 of FIG. 9):

905—Define Nco and alpha0 as inputs to the synthesis, consistent with definitions from ITU Recommendation 1503-2.

910—For all combinations of GSO victim latitudes and delta-longitude values (delta-longitude is the difference in longitude between GSO satellite and GSO victim terminal):

For a list of samples comprising all NGSO satellites in view at any time step over a large number of consecutive time steps, compute:

NGSO Slant Range

Separation angle alpha between NGSO and GSO, from the GSO victim terminal's point of view Define all samples where alpha<alpha0 as non-eligible.

For any time step:

For all samples belonging to that time step and for which alpha>=alpha0, sort samples in increasing order of alpha value. Select up to Nco samples as eligible, with all other samples set to non-eligible.

The aggregate epfd at a given time is calculated as the sum of the epfd from all satellites. The epfd from a given satellite is calculated as the satellite pfd minus terminal discrimination which is a function of the separation angle alpha (e.g. standard terminal discrimination curves are as provided by ITU Recommendation 1428). The satellite pfd is calculated as: pfd=min(pfdmask(alpha), EIRPSD-RangeLoss(R)), where pfdmask is the amplitude of the pfd mask being optimized, EIRPSD is the maximum EIRP spectral density (in dBW/MHz) achievable by the satellite, R is the slant range in meters, and RangeLoss is the signal loss incurred across slant range R, and is given by RangeLoss(R)=10*log 10(4*pi*R2).

Optimize the shape of a pfd mask as a function of separation angle alpha, such that the time cumulative distributed function of aggregate epfd is at or below the specified limit cdf (e.g., cdf from ITU Article 22). This optimization may be performed using Mixed Integer Linear Programming.

The optimized pfd mask is referred to as the "alpha pfd mask" for this delta-Longitude and victim latitude.

915—Build the operational pfd masks. Here we combine the "alpha pfd masks" obtained in the previous step to derive the operational satellite pfd masks for every satellite altitude and sub-satellite latitude.

For any satellite altitude and sub-satellite latitude:

For every Azimuth and Elevation sample in the field of view of the satellite which intersects the Earth:

Compute the Longitude and Latitude of the intersected point on the Earth where a potential GSO victim terminal is presumably located.

For every GEO orbit slot sample,

Compute the delta-Longitude between the GEO orbit slot and the GSO victim terminal longitude Select the closest "alpha pfd mask" corresponding to this delta-Longitude and the victim terminal latitude Evaluate the maximum allowed pfd value using the selected "alpha pfd mask".

Set the pfd mask value for the current Azimuth and Elevation sample to the minimum value from all pfd values evaluated above.

Options and Alternatives

In addition to the implementations described above, the system of the invention may be applied to at least the following applications:

1. In addition to its application for a low-Earth-orbit satellite constellation, the same resource allocation system can be applied to optimally deploy resources from a single geostationary spacecraft or a fleet of geostationary spacecraft. As well, a hybrid constellation formed from a combination of low-Earth-orbit spacecraft and geostationary spacecraft could be optimally deployed using this system.
2. The application of Resource Deployment Optimizer may not be unique to telecommunication satellites. Satellites for other purposes can also benefit from the Resource Deployment Optimizer based on their specific demand requirements.
3. Alternative methods of developing a Resource Deployment Optimizer could be using other optimization techniques for different components. For example, the Allocation Optimizer 120 can be developed based on combinatorial optimization techniques on a graph, instead of a linear programming framework. The Frequency Plan/Time Slot Assignment Generator can also be implemented using other optimization techniques besides linear programming such as matrix assignment, covering arrays etc.
4. For solving the MIP and LP, other solvers besides Gurobi can be utilized. Examples include CPLEX, MOSEK, etc.

CONCLUSIONS

One or more preferred embodiments have been described. It will be apparent to persons skilled in the art that a number of variations and modifications can be made without departing from the scope of the invention as defined in the claims.

The method of the invention may be embodied in sets of executable computer software stored in a variety of formats such as object code or source code. Such code may be described generically as programming code, software, or a computer program for simplification. The embodiments of this invention may be executed by a computer processor or similar device programmed in the manner of method steps, or may be executed by an electronic system which is provided with means for executing these steps. Similarly, an electronic memory medium such computer diskettes, hard drives, thumb drives, CD-ROMs, Random Access Memory (RAM), Read Only Memory (ROM) or similar computer software storage media known in the art, may be programmed to execute such method steps.

All citations are hereby incorporated by reference.

What is claimed is:

1. A communication system comprising:
a constellation of a plurality of non-geostationary and/or geostationary satellites, each of said satellites having assignable communication resources;
a ground system comprising one or more Earth stations for transmitting signals to, and receiving signals from, said constellation of satellites;
a plurality of satellite terminals for transmitting signals to, and receiving signals from, said constellation of satellites; and
a controller operable to dynamically assign satellite and ground system resources in response to demand for communications services required by the plurality of satellite terminals;
wherein the controller is further operable to:
pre-compile a link budget recipe and compute link budgets for all potential links; and
execute an optimization algorithm which uses said pre-compiled and computed link budgets to dynamically assign satellite and ground system resources in response to said demand for communications services required by the plurality of satellite terminals.

2. The system of claim 1 wherein said controller is selected from the group consisting of:
a centralized controller;
a distributed resource controller; and
a plurality of controllers.

3. The system of claim 1 wherein said controller is operable to pre-compile said link budget recipe and compute link budgets using vector-processing.

4. The system of claim 3 said vector-processing comprises a low-level parallelization scheme.

5. The system of claim 1 wherein the optimization algorithm assigns satellites by individual grid point or on a cell-by-cell basis, and assigns satellite communication beam resources by individual grid point or on a cell-by-cell basis.

6. The system of claim 1 wherein said controller is operable to dynamically allocate satellite resources by performing a Venetian Blind algorithm wherein:
a demand grid comprising a continuous stream of time-steps is generated, the continuous stream of time-steps being divided into two streams of time-steps, the Venetian Blind algorithm alternatingly assigning blocks of said time steps into a first stream and a second stream;
each block of time-steps in said first stream of time-steps being optimized in isolation from other blocks of time-steps in said first stream; and
each block of time-steps in said second stream of time-steps being optimized in isolation from other blocks of time-steps in said second stream, using the optimized blocks of time-steps in said first stream of time-steps as boundary-condition constraints.

7. The system of claim 1 wherein said controller is operable to:
prior to optimization, characterize potential satellite to user uplinks and downlinks in terms of spectral efficiency and payload power utilization efficiency data, and
input said spectral efficiency and payload power utilization efficiency data to the optimization algorithm.

8. The system of claim 1 wherein said controller is operable to dynamically allocate satellite resources by:
determining a relaxed solution on a point to point basis, using continuous variables; and
then solving an original mixed integer problem with a more narrowly defined objective and bounds.

9. The system of claim 1 wherein said controller is operable to dynamically allocate satellite resources by:
  balancing minimum satisfaction and average satisfaction as a weighted objective giving equal weights to maximize the minimum satisfaction and the average satisfaction across all grid points; and
  performing an optimization calculation using a straight MIP (mixed integer programming) formulation.

10. The system of claim 1 wherein said controller is operable to dynamically allocate satellite resources by:
  balancing average satisfaction and aggregate capacity as a weighted objective giving equal weight to maximize the average satisfaction across all grid points and the aggregate delivered capacity; and
  performing an optimization calculation using a straight MIP (mixed integer programming) formulation.

11. The system of claim 1 wherein said controller is operable to dynamically allocate satellite resources by:
  balancing average satisfaction and aggregate revenue as a weighted objective giving equal weight to maximize the average satisfaction across all grid points and the aggregate revenue; and
  performing an optimization calculation using a straight MIP (mixed integer programming) formulation.

12. The system of claim 1 wherein said controller is operable to dynamically allocate satellite resources by:
  characterizing the assignment of satellite resources as an optimization problem of integer variables;
  determining a relaxed solution to the optimization problem by converting integer variables to continuous variables;
  maximizing a minimum satisfaction, which is a ratio of given bandwidth to requested bandwidth; and
  solving the optimization problem with a better-behaved objective, comprising a minimum bound and a reduced satisfaction solution space.

13. The system of claim 1 wherein said controller is operable to relax the demand to determine a feasible demand grid which can be met, prior to executing said optimization algorithm.

14. The system of claim 1 wherein said optimization algorithm includes the allocation of throughput on inter-satellite links (ISL).

15. The system of claim 1 wherein said controller is operable to dynamically allocate satellite resources including beam configurations, satellite beam pointing and beam hopping schedule, satellite transmit power, channel bandwidth, symbol rates, data rates, and data paths.

16. The system of claim 1 wherein said controller is operable to incorporate power flux density masks to protect other networks.

17. The system of claim 1 wherein said controller is operable to incorporate power flux density masks, performing power flux density mask calculations as independent tasks, allowing for parallel processing.

18. The system of claim 1 wherein said controller is operable to condition demand to a feasible state by responding to customers who demand satellite resources which go beyond the available capacity, by relaxing the demand to define a feasible demand grid that can be met, the feasible demand grid being used as an input to the optimization algorithm.

19. The system of claim 1 wherein said controller is operable to provide Full link routing and selection optimization, supporting both forward and return links to user terminals routed to a Point of Presence (PoP), by dynamically allocating satellite resources under the additional constraints of:
  aggregate throughput supported by all active links from a given PoP to a given user satellite matching a total throughput delivered to all users assigned to that PoP from this satellite, in both forward downlink and return directions;
  aggregate throughput of all active links over a given ISL being equal to or less than the ISL throughput capability; and
  aggregate bandwidth required to support all active links through a landing station/satellite beam not exceeding the total bandwidth assigned through that beam, in both the forward and return direction.

20. The system of claim 1 wherein said controller is operable to provide Fading analysis and Mitigation as part of the optimization algorithm, by simulating constellation performance using a historical set of globally distributed rain rate data, and optimizing resource allocation using rain fade calculated on a basis of a global rain rate forecasts.

21. The system of claim 1 wherein said controller is operable to model beam bandwidth variables using integers to capture granularity of the allocatable resource.

22. The system of claim 1 wherein said controller is operable to manage beam squint by assigning frequencies to terminals based upon their actual location relative to a position of a beam center at a center frequency.

23. The system of claim 1 wherein said controller is operable to group terminals into fixed ground cells where cell members are jointly connected to a common satellite.

24. The system of claim 1 wherein said controller is operable to optimize resource allocations in a constellation whose satellites can support a constrained set of beam positions, by:
  including an integer constraint of a number of beam positions or targets allowed at a given time; and
  optionally setting branch priorities based on each beam target's capacity demand to speed up resolution of the mixed-integer problem, as higher-demand beam targets are more likely to have a high impact on node feasibility.

25. The system of claim 1 wherein said controller is operable to optimize for long-term link availability under fade by:
  characterizing long-term availability of each instantaneous link; and
  optimizing link allocations over a multi-time-step block to maximize time-averaged long-term availability of a chain of links to any given terminal, in tandem with clear-sky capacity optimization using weighted objectives and/or hierarchical objectives.

26. The system of claim 1 wherein said controller is operable to:
  optimize resource allocations as a network flow problem where a flow value represents a number of links, approximating satellite constraints by flow-capacity constraints which have unitary coefficients and integer constants;
  rather than performing a Mixed Integer Linear Programming optimization utilizing binary variables for the assignment of terminals to satellites.

27. The system of claim 26 wherein said satellite constraints comprise beam bandwidth, frequency reuse constraint, and available radiated RF power.

28. The system of claim 1 wherein said controller is operable to execute the optimization algorithm using a satellite-view beam layout whose pattern moves along deterministic curves following a same general direction as an apparent movement of a uniform distribution of fixed terminals as seen from a satellite.

29. The system of claim 1 wherein said controller is operable to define groups of beams to incorporate frequency re-use constraints, controlling frequency re-use by limiting aggregate effective bandwidth allocated in any cluster of beams, defined as a group of beams all fully coupled among each other based on a threshold spacing in a satellite field of view.

30. A method of operation for a satellite system comprising:
providing:
a constellation of a plurality of non-geostationary and/or geostationary satellites, each of said satellites having assignable communication resources;
a ground system comprising one or more Earth stations for transmitting signals to, and receiving signals from, said constellation of satellites; and
a plurality of satellite terminals for transmitting signals to, and receiving signals from, said constellation of satellites; and
dynamically assigning satellite and ground system resources in response to demand for communications services required by the plurality of satellite terminals by:
pre-compiling a link budget recipe and computing link budgets for all potential links; and
executing an optimization algorithm which uses said pre-compiled and computed link budgets to dynamically assign satellite and ground system resources in response to said demand for communications services required by the plurality of satellite terminals.

31. The method of claim 30 wherein said pre-compiling and executing an optimization algorithm are performed in a manner selected from the group consisting of:
in a centralized manner;
in a distributed manner; and
in a plurality of separate controllers.

32. The method of claim 30 wherein said pre-compiling said link budget recipe and computing link budgets comprises pre-compiling a link budget recipe and compute link budgets for all potential links using vector-processing.

33. The method of claim 32 wherein said vector-processing comprises executing a low-level parallelization scheme.

* * * * *